(12) United States Patent
Lechelt et al.

(10) Patent No.: US 8,840,134 B2
(45) Date of Patent: Sep. 23, 2014

(54) AIRBAG ARRANGEMENT

(71) Applicant: Volvo Car Corporation, Gothenburg (SE)

(72) Inventors: Ulf Lechelt, Vastra Frolunda (SE); Kenneth Ehrs, Hisings Karra (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 13/863,232

(22) Filed: Apr. 15, 2013

(65) Prior Publication Data

US 2013/0270804 A1    Oct. 17, 2013

(30) Foreign Application Priority Data

Apr. 16, 2012 (EP) ..................................... 12164234

(51) Int. Cl.
| | |
|---|---|
| *B60R 21/207* | (2006.01) |
| *B60R 21/231* | (2011.01) |
| *B60R 21/2342* | (2011.01) |
| *B60R 21/26* | (2011.01) |
| *B60R 21/237* | (2006.01) |
| *B60R 21/16* | (2006.01) |

(52) U.S. Cl.
CPC ............. *B60R 21/207* (2013.01); *B60R 21/231* (2013.01); *B60R 2021/23146* (2013.01); *B60R 21/2342* (2013.01); *B60R 2021/161* (2013.01); *B60R 21/26* (2013.01); *B60R 21/237* (2013.01)
USPC ..................................................... 280/730.1

(58) Field of Classification Search
CPC .... B60R 21/26; B60R 21/207; B60R 21/231; B60R 21/237; B60R 2021/161; B60R 2021/23146
USPC .......................... 280/730.1, 730.2, 742, 743.2
See application file for complete search history.

(56) References Cited

U.S. PATENT DOCUMENTS 5,350,188 A * 9/1994 Sato .............................. 280/739
5,362,101 A * 11/1994 Sugiura et al. ............. 280/743.2

(Continued)

FOREIGN PATENT DOCUMENTS

GB        2343420 A  *  5/2000

OTHER PUBLICATIONS

European Patent Office, Extended European Search Report of EP12164235.2, Germany, Oct. 1, 2012, 5 pages.

*Primary Examiner* — Paul N Dickson
*Assistant Examiner* — Robert A Coker
(74) *Attorney, Agent, or Firm* — Alleman Hall McCoy Russell & Tuttle LLP

(57) ABSTRACT

A vehicle airbag arrangement comprises a deployable airbag having a packed state and a deployed state, and a gas generator adapted to supply gas to deploy the airbag from the packed state to the deployed state. At least during initial deployment of the airbag, the gas generator may emit a gas flow substantially in a pre-selected direction. When the airbag is in the packed state, a portion of the airbag forms a starting pocket comprising two panels with an intermediate apex which extend substantially parallel to the pre-selected direction, the starting pocket positioned with the intermediate apex aligned with the pre-selected direction, such that the starting pocket, during the initial deployment of the airbag, initially receives the gas flow, thereby deploying the starting pocket in the pre-selected direction. Such an airbag arrangement may be included in a vehicle seat. A corresponding method of packing an airbag may achieve the airbag arrangement.

20 Claims, 10 Drawing Sheets

(56) References Cited

U.S. PATENT DOCUMENTS

| | | | |
|---|---|---|---|
| 5,573,270 A * | 11/1996 | Sogi et al. | 280/743.2 |
| 5,707,078 A * | 1/1998 | Swanberg et al. | 280/739 |
| 6,095,557 A * | 8/2000 | Takimoto et al. | 280/739 |
| 6,517,105 B1 * | 2/2003 | Ford | 280/731 |
| 6,669,229 B2 * | 12/2003 | Thomas | 280/732 |
| 6,705,638 B2 * | 3/2004 | Abe et al. | 280/732 |
| 7,597,351 B2 | 10/2009 | Kashiwagi | |
| 8,408,592 B2 * | 4/2013 | Hoshi | 280/730.2 |
| 8,491,006 B2 * | 7/2013 | Nagai | 280/743.2 |
| 2003/0218324 A1 * | 11/2003 | Ju et al. | 280/743.1 |
| 2007/0069512 A1 * | 3/2007 | Siegel | 280/740 |
| 2011/0285119 A1 | 11/2011 | Yamamoto et al. | |

* cited by examiner

PRIOR ART

PRIOR ART

US 8,840,134 B2

AIRBAG ARRANGEMENT

CROSS REFERENCE TO RELATED APPLICATIONS

The present application claims priority to European Patent Application No. 12164234.2, filed on Apr. 16, 2012, the entire contents of which are hereby incorporated by reference for all purposes.

TECHNICAL FIELD

The present disclosure relates to an airbag arrangement for a vehicle. The disclosure further relates to a vehicle seat comprising such an airbag arrangement and to a method of packing an airbag for a vehicle.

BACKGROUND

Inflatable airbags are commonly used to protect persons in a vehicle, such as a car, bus, lorry or truck, in case of an accident. An airbag arrangement comprises a deployable airbag and a gas generator arranged to supply gas to deploy the airbag.

A known type of airbag arrangement according to prior art is described below in conjunction with FIGS. 1 and 2, wherein the airbag arrangement is used as a side airbag arrangement. Upon initiation of the gas generator, a gas flow expands radially away from the top of the gas generator in a plurality of arbitrary directions. During deployment the airbag repels against a supportive structure, which is attached to a seat frame, and the seat frame itself, and expands laterally and longitudinally in the vehicle. The airbag also interacts with a hardback of the seat during deployment. The airbag further interacts with a door, b-pillar and panel at the side of the vehicle during deployment. Much volume is deployed in a very short time. The deployment of the airbag may lead to high forces against the parts of the seat, e.g. against the hardback.

Document US 2011/0285119 A1 discloses a side airbag system and a method of manufacturing a side airbag arrangement. The airbag arrangement comprises an upper airbag portion and a lower airbag portion divided by a tether portion. A tube, which distributes gas between the upper and lower airbag portions, extends through the tether portion to the upper and lower airbag portions. In one embodiment, the gas generator is arranged inside the tube, which is inflated prior to the upper and lower airbag portions.

However, since the tube of document US 2011/0285119 A1 extends in a substantially vertical direction, the airbag will reach its vertical deployed extension before being fully deployed longitudinally in the desired direction, which is substantially forwards in the vehicle. There are further similar risks as described above for high forces against the parts of the seat.

U.S. Pat. No. 7,597,351 B2 discloses a side airbag arrangement comprising an airbag and a gas generator. The gas generator emits gas from one end only, directed in a longitudinal direction of the gas generator.

However, since the gas generator of U.S. Pat. No. 7,597,351 B2 is mounted at the seat with the longitudinal direction of the gas generator along the direction of the backrest of the seat, i.e. close to a vertical direction, the gas flow will be substantially vertical. Therefore the airbag will reach its vertical deployed extension before being fully deployed longitudinally in the desired direction, which is substantially forwards in the vehicle. There are further similar risks as described above for high forces against the parts of the seat.

SUMMARY

The object of the present disclosure is to overcome or ameliorate at least one of the disadvantages of the prior art, or to provide a useful alternative.

It is desirable to provide an airbag arrangement, wherein the airbag at least initially deploys in a pre-selected direction, the pre-selected direction typically being a direction of desired initial deployment.

It is further desirable to provide an airbag arrangement, wherein high forces against the parts of the seat during deployment of the airbag are avoided, or at least reduced, as compared to a prior art airbag arrangement.

It is also desirable to provide an airbag arrangement which enables a correct positioning of the airbag during initial deployment.

The object above may be achieved by a first aspect of the present invention in which there is provided an airbag arrangement for a vehicle, the airbag arrangement comprising a deployable airbag, the airbag having a packed state and a deployed state, a gas generator adapted to supply gas to deploy the airbag from the packed state to the deployed state, the gas generator being adapted to, at least during initial deployment of the airbag, emit a gas flow substantially in a pre-selected direction, wherein, when the airbag is in the packed state, a portion of the airbag forms a starting pocket comprising two panels with an intermediate apex, the panels extending substantially parallel to the pre-selected direction, the starting pocket being positioned with the intermediate apex aligned with the pre-selected direction, such that the starting pocket, during the initial deployment of the airbag, initially receives the gas flow and is deployed in the pre-selected direction.

The pre-selected direction is the direction in which the airbag is desired to, at least initially, deploy. For example, if the airbag arrangement is a side airbag arrangement, the pre-selected direction is substantially in the longitudinal direction of the vehicle, such that the airbag in as short a time as possible may, at least partly, but preferably substantially completely, fill the space in between the seat and the side of the vehicle, thereby protecting a person sitting in the seat from impacting with a door, b-pillar, panel and/or similar at the side of the vehicle. The airbag according to the present disclosure will be able to in a short time reach a correct positioning, since the airbag deploys in the desired direction from the very beginning of the deployment.

The starting pocket is formed by a portion of the airbag. The starting pocket acts as a gas-receiving cavity. During initial deployment of the airbag, the starting pocket receives all or substantially all of the emitted gas. The starting pocket may form between 0% and 10% of the total deployed volume of the airbag. Preferably the starting pocket may form between 0% and 5% of the total deployed volume of the airbag A panel of the airbag fabric is defined as a portion of the airbag fabric being located between two folds of an airbag. In the packed state, the airbag may be folded or partly folded and partly rolled. Purely as an example, the starting pocket may be folded as well as the remaining portion of the airbag. Purely as another example, the starting pocket may be folded and the remaining portion of the airbag may be rolled. Combinations of folding and rolling the remaining portion of the airbag except for the starting pocket are also possible.

The initial deployment is the deployment phase immediately after initiation of the gas generator. Purely as an example, the initial deployment phase may be between 5% and 60% of the total deployment time of the airbag, preferably between 10% and 50%, most preferably between 20% and 40%. Typically the initial deployment may be between 1 and 5 milliseconds long.

In an embodiment, the starting pocket is adapted to be deployed by the gas flow flowing substantially in the pre-selected direction during deployment of the airbag. The gas then flows into the airbag without any change of direction during the whole deployment of the airbag. When fully deployed, the airbag of this embodiment will have its longitudinal extension in the same direction as the pre-selected direction.

The panels of the starting pocket may be arranged towards the gas generator, such that the gas flow emitted during initial deployment is emitted in between the two panels of the starting pocket. This helps to guide the gas flow in the desired direction, i.e. the pre-selected direction.

The airbag may be folded in such a way that the airbag in its packed state further comprises at least one additional panel at at least one side of the starting pocket, the additional panel preferably having a panel width substantially corresponding to a length of the starting pocket, wherein the length is measured from the gas generator to the apex of the starting pocket. Thereby the airbag will have a practical flat shape when packed.

The additional panels form additional gas pockets, which are arranged to be deployed after the starting pocket has been at least partly deployed. The number of additional pockets may be any number, such as zero, one, two, three, four, five, six, seven, eight, nine, ten etc, at either side of the starting pocket.

The airbag may comprise the same number of additional panels at either side of the starting pocket.

Alternatively, the airbag may comprise more additional panels at one side of the starting pocket than at the other side of the starting pocket.

The additional panels may have the same panel widths, making it possible to pack the airbag into a flat package. Alternatively, the panels may have different panel widths.

It is possible to control the direction of deployment and hence the direction of the fully deployed airbag by packing the airbag in a predetermined way, e.g. by selecting the number of additional panels at either side of the starting pocket, the widths of the additional panels, and/or by selecting whether the location of the gas generator is symmetric or asymmetric. In general terms, e.g. if the remaining portion of the airbag except for the starting pocket is rolled, the direction of deployment may be varied by varying the amount of airbag fabric at either side of the starting pocket. Similarly, an amount of airbag fabric at either side of the starting pocket may be varied based on a pre-selected deployment direction, e.g. in order to achieve deployment in the pre-selected deployment direction. Varying the amount of airbag fabric at either side of the starting pocket may comprise, for example, selecting a number of additional panels at either side of the starting pocket and selecting widths of the additional panel(s). Additionally or alternatively, the variation of the amount of airbag fabric at either side of the starting pocket may be based on whether the location of the gas generator is symmetric or asymmetric within the airbag.

The airbag may in its packed state further comprise at least one tear seam connecting two adjacent panels, the tear seam being adapted to break during deployment of the airbag.

The tear seam may be used to hold the panels of the airbag together in the packed state of the airbag. The tear seam may connect two adjacent additional panels or a panel of the starting pocket with an additional panel. The tear seam may also cross-over substantially all the panels. The tear seam may for example be used to hold the additional panels together at each side of the starting pocket. Thereby, a slim package is achieved. Further, the tear seam may be used to prevent deployment expansion sideways relative to the pre-selected direction, until the front of the starting pocket has travelled forward in the pre-selected direction long enough to be able to start pulling the additional panels. The tear seam is adapted to break at a relatively low breaking force, which is much lower than a force which would risk damaging the fabric layer of the airbag. The exact size of the breaking force is suitably adapted to the desired purpose of controlling the deployment. The term tear seam is used not only to denote actual seams, but may also be used for other arrangements having the same purpose, such as a string of adhesive. Alternatively, or in addition, an adhesive may be used in between two panels to hold them together in the packed state of the airbag.

A portion of the starting pocket may comprise a reinforcing airbag fabric layer at a location corresponding to where the gas flow emitted in the pre-selected direction initially hits the starting pocket. Thereby the fabric layer of the airbag is reinforced where it is needed, while the rest of the fabric layer of the airbag may be made thinner helping to achieve a low weight of the airbag.

The airbag arrangement may further comprise a tubular structure leading from the gas generator into the starting pocket. This will guide the emitted gas in the desired direction.

The airbag may further comprise at least one airbag seam forming a gas flow channel arranged to collect the gas flow during the initial deployment, thereby guiding the gas flow in the pre-selected direction.

The airbag arrangement according to the disclosure may be used in any suitable position in the vehicle, for example as a side airbag arrangement.

A side wall of the gas generator may comprise a first notch on the side of the gas generator corresponding to the pre-selected direction, through which first notch the gas flow substantially in the pre-selected direction is emitted. There may be one first notch or a plurality of first notches directed in the pre-selected direction.

The gas generator may further comprise a second notch positioned in the side wall opposite to the first notch. There may be one second notch or a plurality of second notches. If the first and second notch(es) are chosen such that their gas flows neutralize each other, the gas generator is referred to as thrust neutral. This is appropriate at least during manufacturing, storing and transportation, since the gas flow from the first notch(es) would balance the gas flow from the second notch(es), e.g. if the gas generator would be initiated by mistake.

The airbag arrangement may further comprise a deflector, the gas generator being attached to the deflector, such that the second notch is at least partly blocked during deployment of the airbag by the deflector. Therefore, when the gas generator is mounted in the seat, the gas generator will primarily emit gas in the pre-selected direction. The deflector blocking the second notch may be an additional plate, or a part of the seat frame.

The described gas generator may be used in any airbag arrangement, including airbag arrangements using airbags according to prior art. The gas generator may therefore be sold as a separate unit, independent of the rest of the airbag arrangement.

In a second aspect of the present invention there is provided a vehicle seat comprising an airbag arrangement as described above.

In a third aspect of the present invention there is provided a vehicle seat comprising a gas generator as described above.

In a fourth aspect of the present invention there is provided a vehicle comprising an airbag arrangement as described above.

In a fifth aspect of the present invention there is provided a vehicle comprising a gas generator as described above.

In a sixth aspect of the present invention there is provided a vehicle comprising a vehicle seat as described above.

In a seventh aspect of the present invention there is provided a method of packing an airbag for a vehicle, the method comprising the steps of pre-selecting a deployment direction of the airbag, forming a starting pocket in the airbag comprising two panels with an intermediate apex, aligning the starting pocket in the pre-selected deployment direction of the airbag, with the panels extending substantially parallel to the pre-selected deployment direction, and folding and/or rolling the airbag except for the starting pocket at at least one side of the starting pocket.

The phrase "at a side of the starting pocket" refers to when the airbag is seen in a cross-sectional view from above as mounted in a vehicle seat.

In an embodiment of the method, the method is a method of folding an airbag, the method comprising the steps of forming a starting pocket, adapted to deploy in the pre-selected deployment direction of the airbag when mounted in a vehicle, compressing the remaining portion of the airbag except for the starting pocket in a direction substantially parallel to the pre-selected direction to form a substantially flat shape, folding the airbag in a direction substantially perpendicular to the pre-selected direction in at least one fold, preferably the fold being V-shaped, most preferably being V-shaped with a panel width substantially corresponding to a length of the starting pocket, and compressing the at least one fold in the direction substantially perpendicular to the pre-selected direction, thereby forming a flat package.

As an alternative to folding, or as a complement, the remaining portion of the airbag except for the starting pocket may be rolled.

The method is suitable for packing an airbag of a side airbag arrangement.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
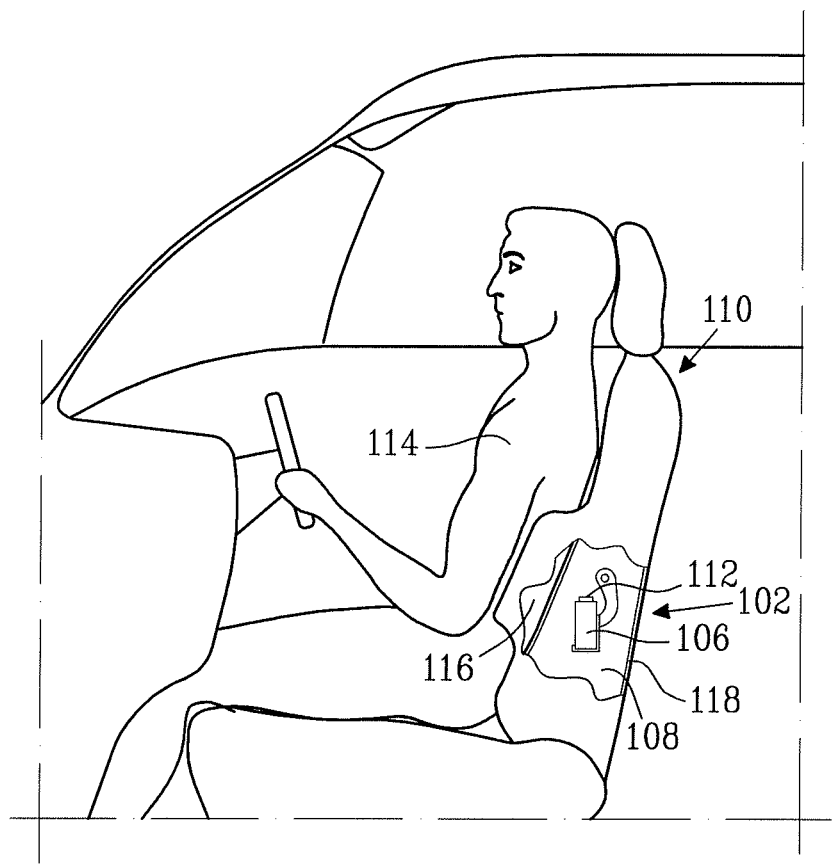
FIG. 1 is a schematic view of an airbag arrangement according to prior art with the airbag being removed for better visibility.
Figure 2A:
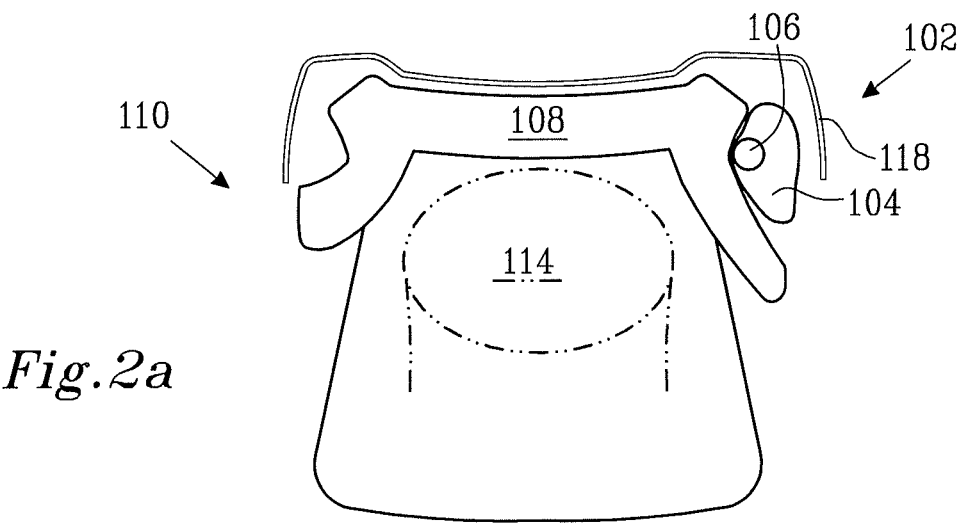
FIGS. 2a-b show a top cross-sectional view of the prior art airbag arrangement of FIG. 1, during initial deployment of the airbag (FIG. 2a), and during subsequent deployment of the airbag (FIG. 2b)
Figure 2B:
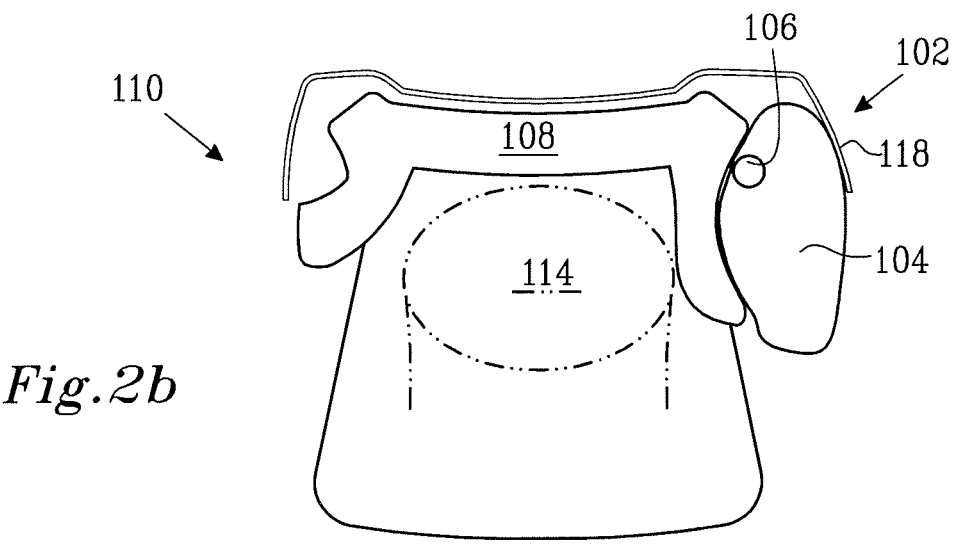

FIGS. 1 and 2a-b schematically illustrate an airbag arrangement 102 according to prior art being used as a side airbag arrangement. FIG. 1 is a side view with the airbag of the airbag arrangement 102 removed for better visibility. FIGS. 2a-b are top cross-sectional views, in which the airbag 104 is visible. The airbag arrangement 102 comprises a gas generator 106 attached to a seat frame 108 of a vehicular seat 110. Upon initiation of the gas generator 106, a gas flow expands radially away from the top 112 of the gas generator 106 in a plurality of directions. The airbag 104 is intended to protect a person 114, sitting in the seat 110, from impacting with a door, b-pillar, panel and/or similar at the side of the vehicle (not illustrated). The airbag 104 is thus intended to inflate and fill the space in between the seat 110 and the side of the vehicle. The airbag arrangement 102 further may optionally comprise a supportive structure 116 attached against the seat frame 108 helping to direct the airbag 104. During deployment, the airbag 104 repels against the optional supportive structure 116 and the seat frame 108 and expands laterally and longitudinally in the vehicle, as illustrated in FIGS. 2a-b. The airbag 104 also interacts with a hardback 118 of the seat 110 during deployment. The airbag 104 further interacts with the door, b-pillar and panel at the side of the vehicle during deployment. Much gas is emitted in a very short time inside the airbag 104. The deployment of the airbag 104 may lead to undesirable effects such as high forces against the parts of the seat 110, e.g. against the hardback 118, as illustrated in FIG. 2b.

Figure 3:
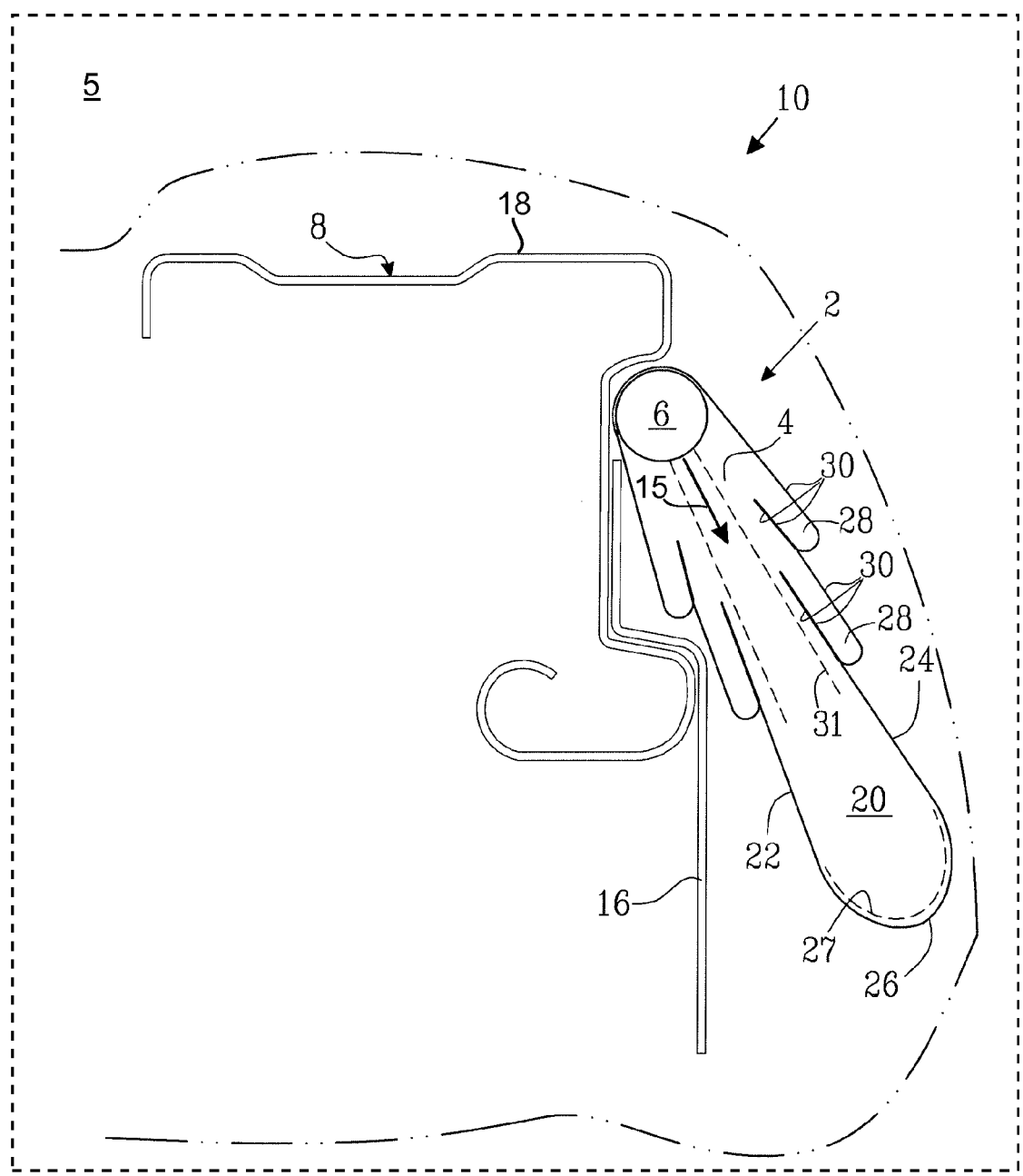
FIG. 3 illustrates an airbag arrangement according to a first embodiment of the invention during initial deployment of the airbag.

FIG. 3 illustrates an airbag arrangement 2 according to a first embodiment of the invention during initial deployment of an airbag 4. In this embodiment, the airbag arrangement 2 forms a side airbag arrangement of a vehicle 5. A gas generator 6 emits gas in a pre-selected direction, represented by arrow 15, being mainly in the longitudinal direction of the vehicle 5. The gas generator 6 is attached to a seat frame 8 of a seat 10 of vehicle 5. The shape of the seat frame 8 is adapted to the gas generator 6, as further explained in conjunction with FIG. 11. The airbag arrangement 2 also comprises a supportive structure 16 attached against the seat frame 8.

The pre-selected direction 15 has been selected such that the airbag 4 will be deployed into the space in between the seat 10 and the side of the vehicle 5. In the illustrated case, the pre-selected direction 15 is substantially in the longitudinal direction of the vehicle 5. Thereby, high forces against the parts of the seat 10, such as the hardback 18, during deployment are avoided, or at least reduced, as compared to a prior art airbag arrangement 102, which has a radial gas flow in a plurality of directions, see FIGS. 1-2b. Interaction with the door, b-pillar and panel at the side of the vehicle 5 is also avoided, or reduced, as compared to the prior art airbag arrangement 102 during deployment. The details of the gas generator 6 will be further explained below in conjunction with FIGS. 10 and 11. The airbag 4 will be able to in a short time reach a correct positioning, since the airbag 4 deploys in the desired direction from the very beginning of the deployment.

The airbag 4 has been folded in such a way that a starting pocket 20 comprising two panels 22, 24 and an intermediate apex 26 is formed. The panels 22, 24 are formed by a fabric layer of the airbag 4. A panel of the airbag fabric is defined as a portion of the airbag fabric being located between two folds of the airbag. The panel thus forms a "wall". In the packed state of the airbag 4, the starting pocket 20 is positioned with the intermediate apex 26 being aligned with the pre-selected direction 15, such that the starting pocket 20 during the initial deployment of the airbag 4, at least initially, receives the gas flow emitted from the gas generator, thereby deploying the starting pocket 20 in the pre-selected direction 15. The fabric of the starting pocket 20 may optionally be reinforced with an extra fabric layer 27, in particular in the region where the emitted gas flow initially hits the fabric, i.e. around the apex 26.

FIG. 3 illustrates the situation during initial deployment, illustrating that the gas flow emitted from the gas generator 6 is received by the starting pocket 20, thereby propelling the starting pocket 20 in the pre-selected direction 15. The airbag 4 further comprises two additional pockets 28 at either side of the starting pocket 20. Each additional pocket 28 comprises two additional panels 30. The example illustrated in FIG. 3 thus comprises altogether five pockets having altogether ten panels. However, the number of additional pockets may be any number, such as one, two, three, four, five, six, seven, eight, nine, ten etc. Even if the example has two additional pockets 28 at either side of the starting pocket 20, when seen in the cross-sectional view from above, there may optionally also be a different number of additional pockets 28 at the two sides.

In order to further guide the emitted gas flow, the starting pocket 20 may, as an option, comprise a tubular structure 31 and/or an internal airbag seam. The tubular structure 31 may have a frustoconical shape as in FIG. 3. The smaller end of the tubular structure 31 encompasses a notch of the gas generator 6 emitting the gas flow. The larger end is directed towards the apex 26 of the starting pocket 20. The tubular structure may be as long as the starting pocket 20 when the airbag 4 is packed, in one example. In other examples, the tubular structure may be a different length.

FIGS. 4a-e illustrate in a number of steps how to fold an airbag 4' of an airbag arrangement 2 according to a second embodiment of the invention. The airbag arrangement 2 is shown in a cross-sectional view seen from above in the vehicle.

Figure 4:
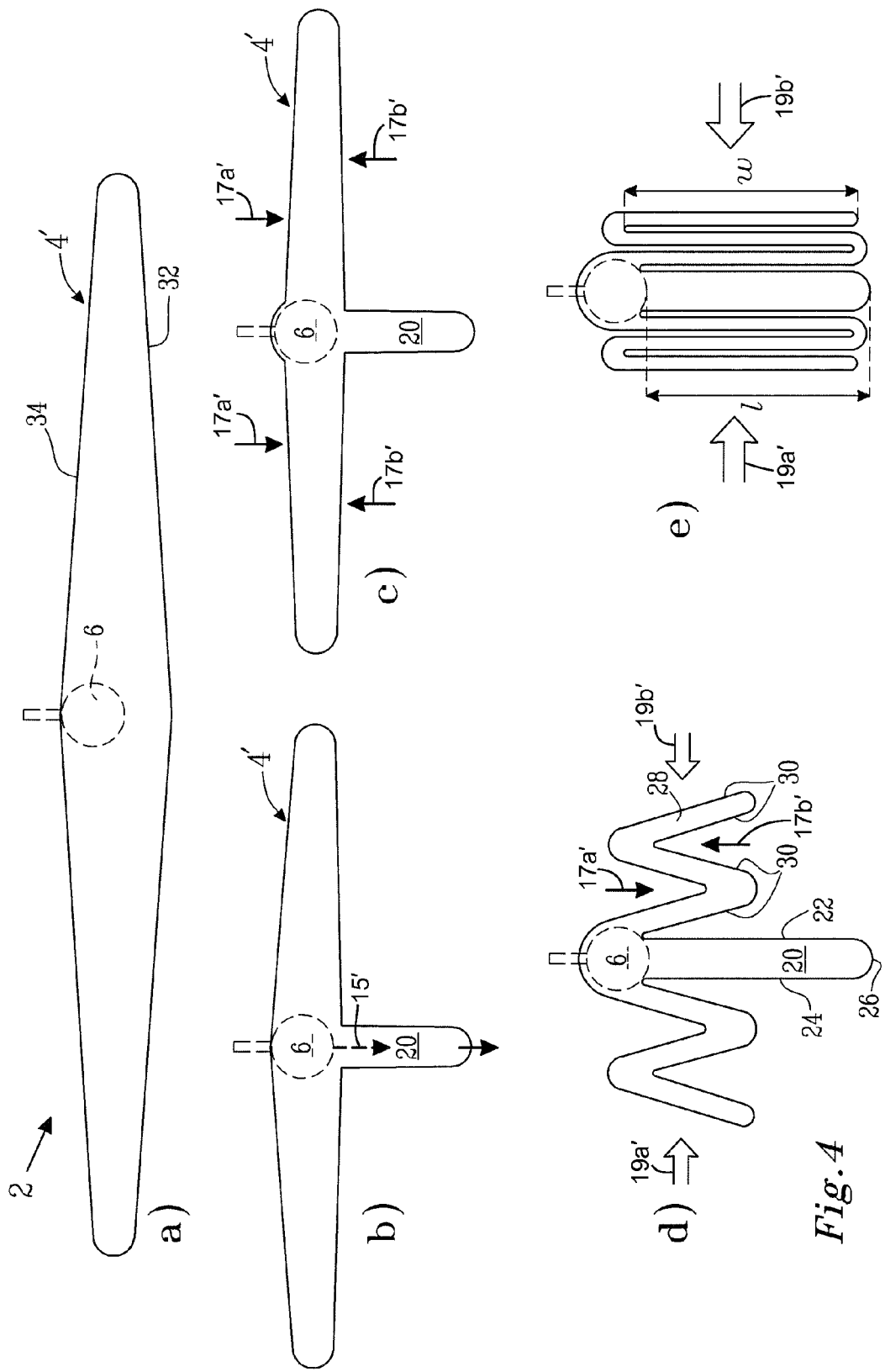
FIGS. 4a-e illustrate how an airbag arrangement according to a second embodiment of the invention is folded.
Figure 5:
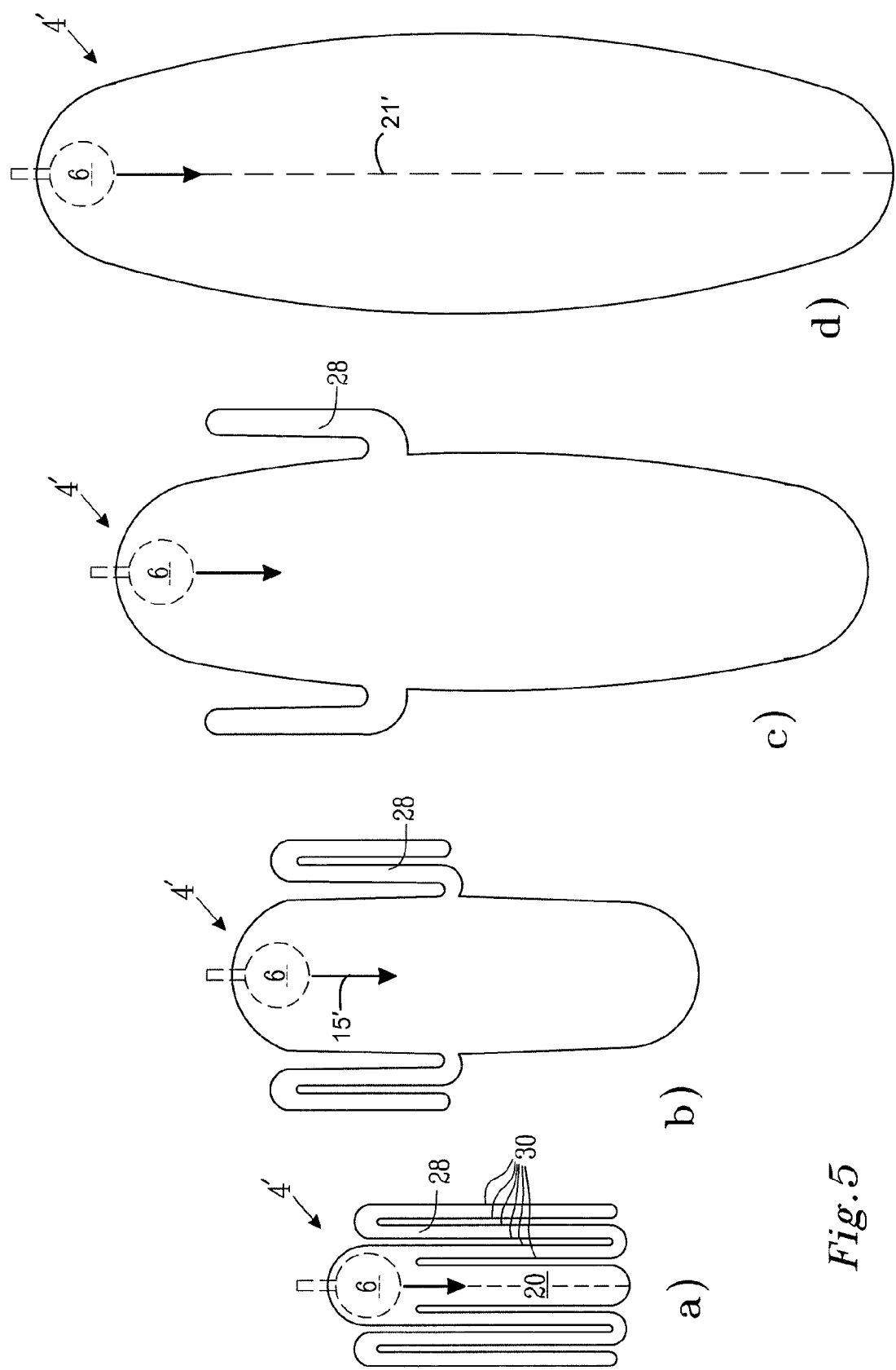
FIGS. 5a-d illustrate how the airbag of FIGS. 4a-e is deployed.

FIG. 4a shows the airbag arrangement 2 before folding begins. The gas generator 6 is located symmetrically within the airbag 4'. Alternatively, the gas generator 6 may be located outside the airbag 4' in such a way that the gas emitted from the gas generator is conducted into the airbag 4', for example by a channel forming part of the airbag 4'. The airbag 4' comprises a front fabric layer 32 and a rear fabric layer 34.

First a desired direction 15' for initial deployment is selected. In the next step, the starting pocket 20 is formed and aligned with the pre-selected direction 15'. See FIG. 4b. The starting pocket 20 is located opposite to the gas generator 6, such that the gas outlet of the gas generator 6 will emit the gas into the starting pocket 20 during initial deployment.

Then the remaining portion of the airbag 4' except for the starting pocket 20 is folded, as illustrated, and/or rolled. The folding may be done by compressing the remaining portion of the airbag 4' in a first compression direction represented by arrows 17a' and 17b', substantially parallel to the pre-selected direction 15', such that the remaining portion achieves a flat shape. See FIG. 4c.

Thereafter, the compressed rest of the airbag 4' except for the starting pocket 20 is folded in a zigzag-shape. Thereby additional panels 30 are formed, giving an additional pocket 28 at either side of the starting pocket 20. In the illustrated variant of the folding, each V-shape of the airbag 4' comprises two panels belonging to the front fabric layer 32 and two panels belonging to the rear fabric layer 34. A number of panels 30 form the additional pockets 28. See FIG. 4d, wherein each additional pocket 28 is formed by altogether six panels, three of them belonging to the front fabric layer 32 and three of them to the rear fabric layer 34.

Next, the airbag 4' is compressed from the side, i.e. in a second compression direction represented by arrows 19a' and 19b', substantially perpendicular to the first compression direction 17a' and 17b'. See FIG. 4e. In the illustrated embodiment, the panel width w of the additional panels 30 is substantially the same as a length l of the starting pocket 20, wherein the length l is measured from the gas generator 6 to the apex 26 of the starting pocket 20. Thereby a flat package is formed in the last step.

FIGS. 5a-d illustrate the deployment of the airbag 4' of FIGS. 4a-e. At initial deployment, the gas generator 6 emits gas into the starting pocket 20, which gradually is filled and propelled in the pre-selected direction 15' (see arrow in FIG. 5a). A cross-sectional length axis 21', see the dashed line, of the filled portion of the airbag 4' coincides with the pre-selected direction 15' during initial deployment as in FIG. 5a. The starting pocket 20 pulls out the additional panels 30, and hence the additional pockets 28, at either side of the starting pocket 20, when the airbag 4' is gradually filled with gas. At least in theory, first the most adjacent additional panels 30 are pulled out, thereafter the following and so on. See FIGS. 5b and 5c. Eventually, the last additional panels 30 are pulled out until the airbag 4' is fully deployed. See FIG. 5d.

FIGS. 4a-e and 5a-d illustrate an embodiment in which the airbag arrangement 2 has the same number of additional panels 30 at either side of the starting pocket 20. Further the additional panels 30 have the same width, and hence the additional pocket 28 at either side of the starting pocket 20 is of a similar size. Therefore, the airbag 4' is pulled straight out from the gas generator 6. Hence, the cross-sectional length axis 21' of the airbag 4', see the dashed line, coincides with the pre-selected direction 15' during the whole deployment as seen in the sequence of FIGS. 5a-d.

FIGS. 6a-c and 7a-d instead illustrate an embodiment wherein the airbag arrangement 2 has more additional panels 30 at one side of the starting pocket 20 than at the other. Hence the additional pocket is larger at one side of the starting pocket 20 than at the other. This way of folding may be used when the desired direction of the cross-sectional length axis of the fully deployed airbag 4" differs from the pre-selected direction 15" of the gas flow used during initial deployment.

Figure 6:
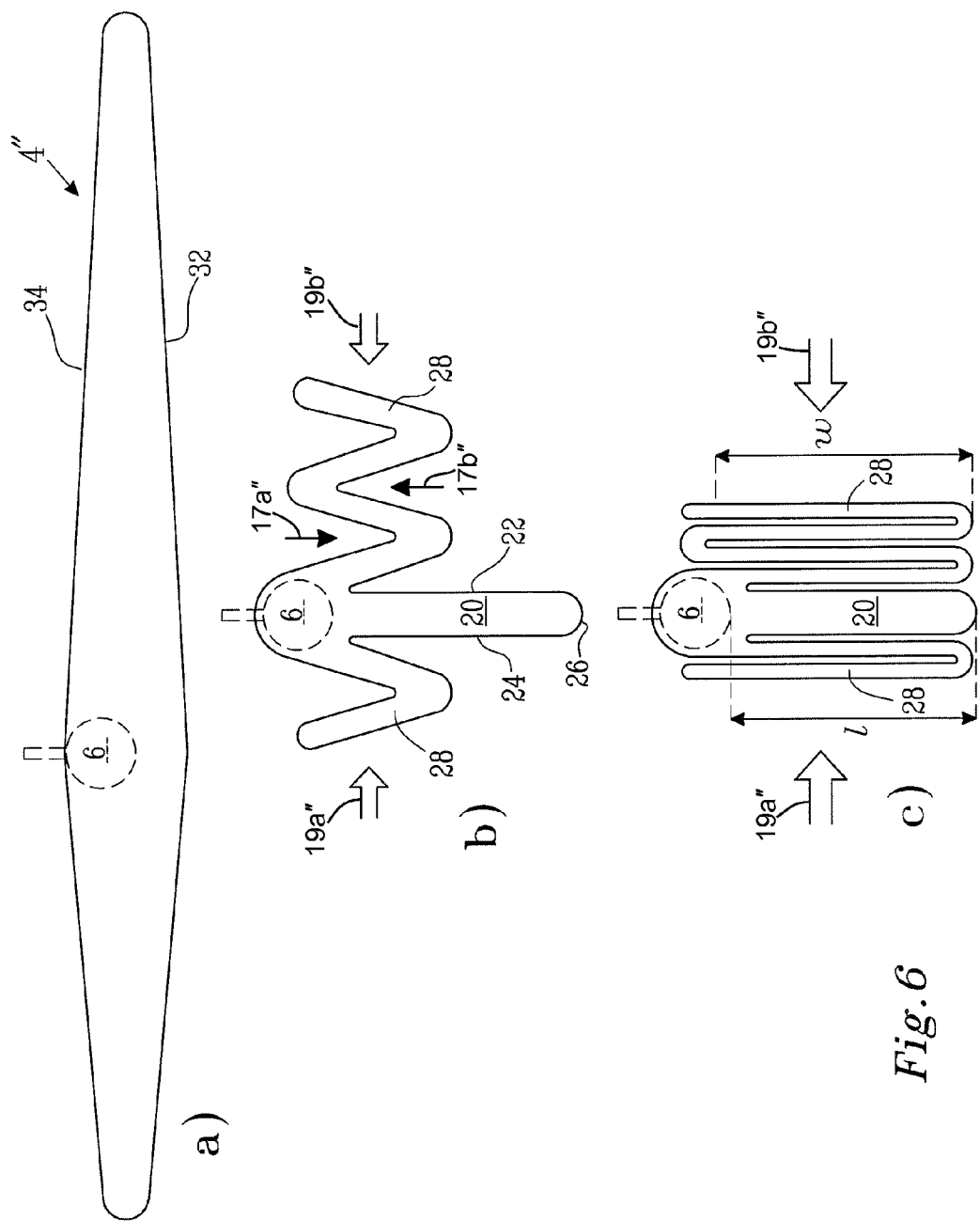
FIGS. 6a-c illustrate how an airbag arrangement according to a third embodiment of the invention is folded.
Figure 7:
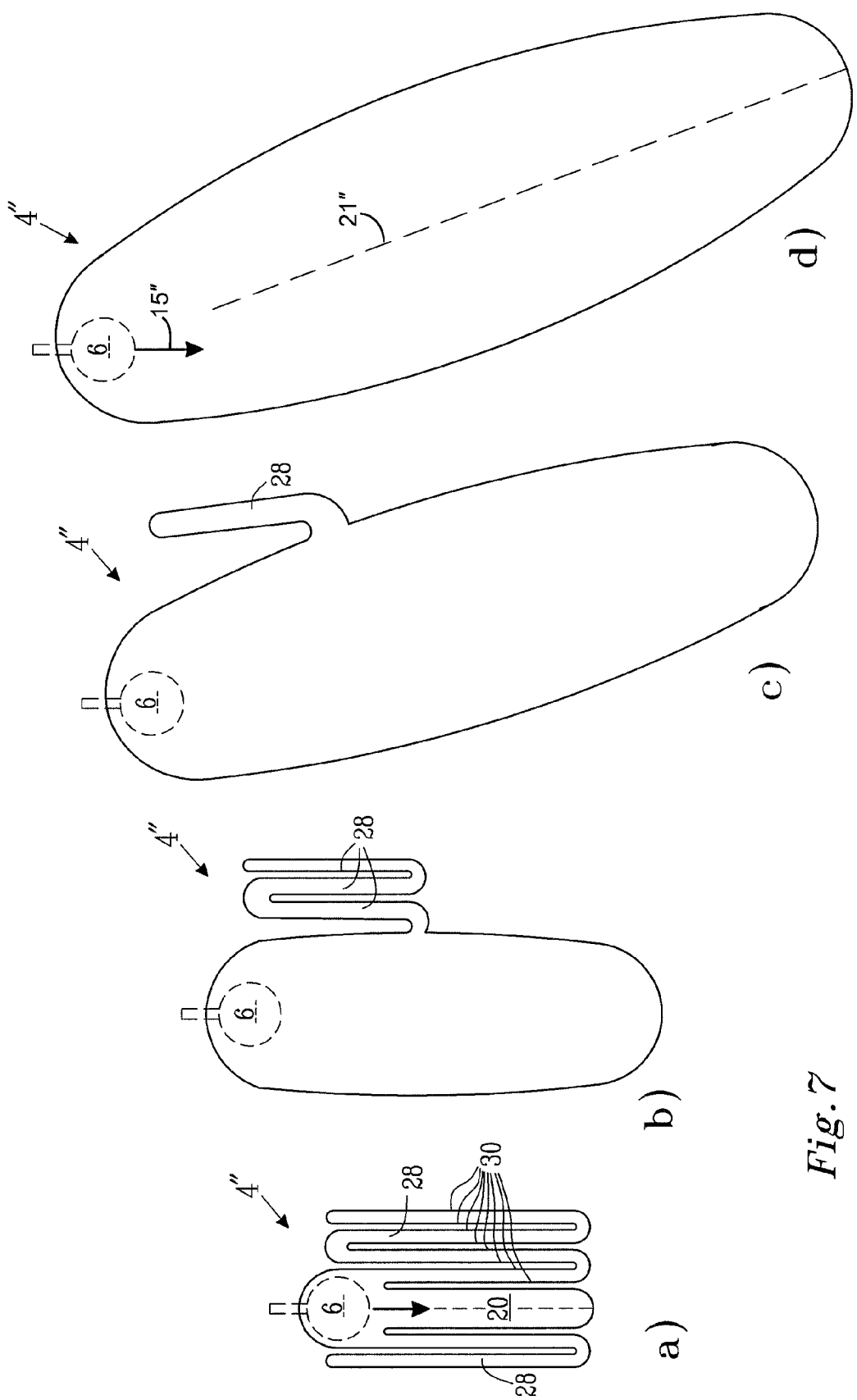
FIGS. 7a-d illustrate how the airbag of FIGS. 6a-c is deployed.
Figure 9:
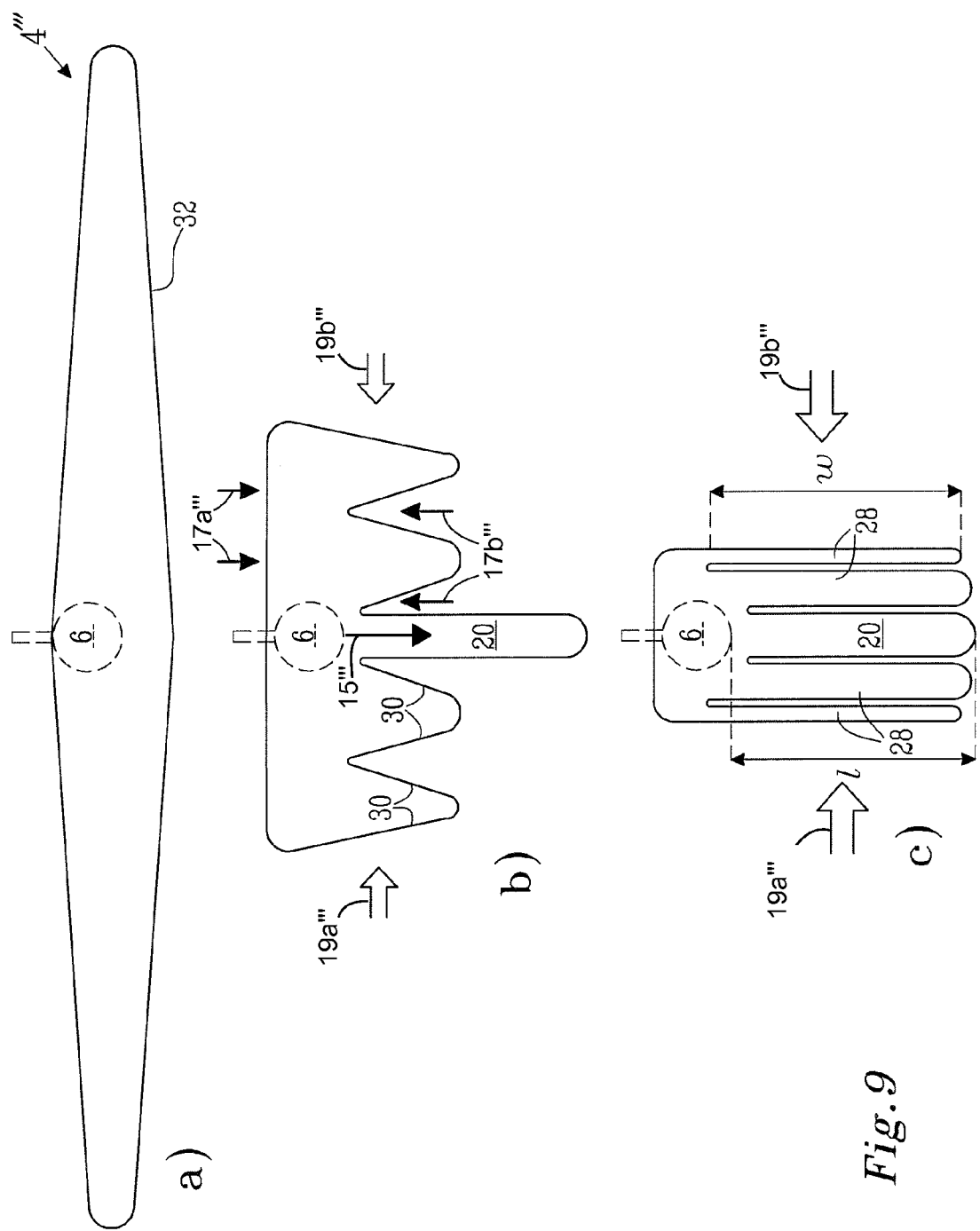
FIGS. 9a-c illustrate how an airbag arrangement according to a fourth embodiment of the invention is folded.

FIG. 6a shows an embodiment with the gas generator 6 asymmetrically positioned in the airbag 4", i.e. not in the centre. This position may be compared to FIG. 4a showing a symmetrical position. The starting pocket 20 is formed in an equivalent way as for FIG. 9. Further, as shown in FIG. 6b, the airbag 4" is compressed in a first compression direction represented by arrows 17a" and 17b", zigzag-folded, and then compressed in the other direction (e.g., a second compression direction represented by arrows 19a" and 19b" which is similar to that shown in FIGS. 4d-e), ending up in a shape as shown in FIG. 6c.

FIGS. 7a-d show deployment of the airbag 4" of FIGS. 6a-c. First, the starting pocket 20 is filled with gas being emitted from the gas generator 6 in the pre-selected direction 15", see arrow. The cross-sectional length axis 21" of the filled portion of the airbag 4" at initial deployment, i.e. the starting pocket 20, coincides with the pre-selected direction 15" during initial deployment as in FIG. 7a. The starting pocket 20 pulls out the additional panels 30 at either side of the starting pocket 20, and hence the additional pockets 28. At least in theory, first the most adjacent additional panels 30 are pulled out, thereafter the following and so on. See FIG. 7b. Since there are fewer additional panels 30 on the left-hand side, and thus a smaller portion of the airbag, than on the right-hand side, the left-hand side will be ready before the right-hand side. Therefore, the left-hand side of the airbag 4" will be stretched and the deployment will continue on the right-hand side only. See FIG. 7c. Eventually, the last additional panels 30 are pulled out, and the airbag 4" is fully deployed. See FIG. 7d. When the airbag 4" is fully deployed, the cross-sectional length axis 21" of the airbag 4", see the dashed line, differs from the pre-selected direction 15", see arrow. This difference is a result of the way the airbag 4" was packed. It is thus possible to control the direction of the fully deployed airbag by folding the airbag 4" in a predetermined way, e.g. by selecting the number of additional panels 30 at either side of the starting pocket 20, the widths of the additional panels 30 and/or the location of the gas generator being symmetric or asymmetric. In general terms, e.g. if the remaining portion of the airbag except for the starting pocket is rolled, the direction of deployment may be varied by varying the amount of airbag fabric at either side of the starting pocket.

Figure 8:
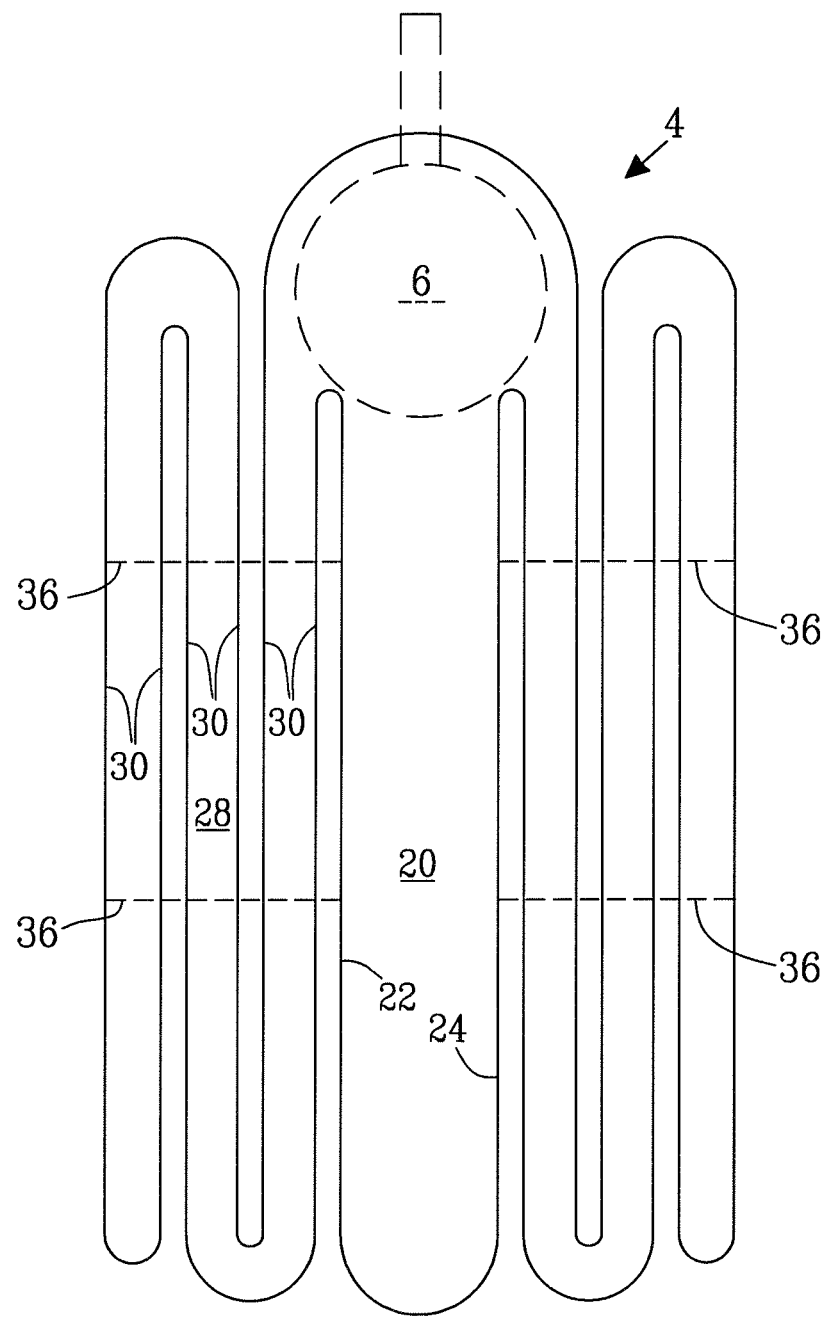
FIG. 8 illustrates tear seams.

Tear seams may be used to hold the panels of the airbag 4 together in the packed state of the airbag 4. A tear seam 36 may connect two adjacent additional panels 30 or may crossover substantially all the additional panels 30. In an embodiment, which is illustrated in FIG. 8, tear seams 36 are used to hold the additional panels 30 together and to connect them to a panel 22, 24 of the starting pocket 20. Thereby, a slim package is achieved. Further, the tear seam 36 may be used to prevent deployment expansion sideways relative to the pre-selected direction until the front of the starting pocket 20 has traveled forward in the pre-selected direction long enough to be able to start pulling the additional panels 30. The tear seam 36 is adapted to break at a relatively low breaking force, which is much lower than a force which would risk damaging the fabric layer of the airbag 4. The exact size of the breaking force is suitably adapted to the desired purpose of controlling the deployment.

FIGS. 9a-c illustrate another variant of folding an airbag arrangement according to the invention.

FIG. 9a shows the airbag arrangement 2 at the start, which is similar to FIG. 4a. The gas generator 6 is symmetrically located within the airbag 4'''.

First a desired (pre-selected) direction 15''' for initial deployment is selected. In the next step, the starting pocket 20 is formed and aligned with the pre-selected direction 15'''. See FIG. 9b. The starting pocket 20 is located opposite to the gas generator 6 such that the gas outlet of the gas generator 6 will emit the gas into the starting pocket 20 during initial deployment. This step is equivalent to FIG. 4b. Thereafter the airbag 4''' is compressed like in FIG. 4c (e.g., in a first compression direction represented by arrows 17a''' and 17b''' and in a second compression direction represented by arrows 19a''' and 19b'''). However, in the next step only the front fabric layer 32 of the airbag 4''', except for the starting pocket 20, is folded in a zigzag-shape. Thereby, additional panels 30 are formed in the front fabric layer 32 only. Therefore each V-shape comprises two panels of the front fabric layer 32 with an inflatable portion of the airbag 4''' in between. The result is shown in FIG. 9c as two additional pockets 28 at either side of the starting pocket 20, each additional pocket 28 comprising two additional panels 30. The panel width w of the additional panels 30 is substantially the same as the length l of the starting pocket 20.'''

The airbag 4 illustrated in FIG. 3 may be folded as illustrated in FIGS. 9a-c with two additional pockets 28 at either side, but any number of additional pockets may be used at either side. Further, the folding variant of FIGS. 9a-c may also suitably be used for the case when the gas generator 6 is asymmetrically positioned in the airbag 4" as in FIG. 6a.

Figure 10:
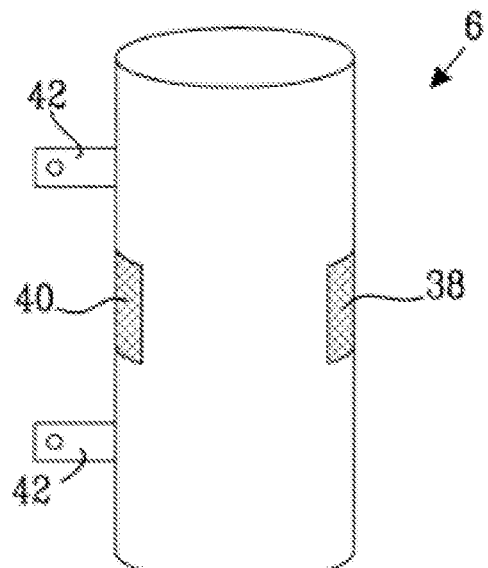
FIG. 10 illustrates a notched gas generator.

FIG. 10 schematically illustrates a gas generator 6 suitable for use in an airbag arrangement according to the invention. Such a gas generator 6 may be used in any airbag arrangement, including airbag arrangements using airbags according to prior art. Further, although the illustrated gas generator 6 is suitable for a side airbag arrangement, it can also be used for an airbag arrangement at another position of the vehicle. The gas generator 6 may therefore be sold as a separate unit, independent of the rest of the airbag arrangement 2.

The gas generator 6 of FIG. 10 comprises a first notch 38 for emitting gas at the side wall of the gas generator 6 at a location corresponding to the pre-selected direction, when the gas generator 6 is mounted in the vehicle. There may be one first notch 38 as in FIG. 10 or a plurality of first notches 38 directed in the pre-selected direction. The gas generator 6 further comprises a second notch 40 positioned in the side wall opposite to the first notch 38. There may be one second notch 40 as in FIG. 10 or a plurality of second notches 40 directed in the direction opposite to the pre-selected direction. If the positions of the first and second notches 38 and 40 are chosen such that their gas flows neutralize each other, the gas generator 6 is referred to as being thrust neutral. This is appropriate during manufacturing, storing and transportation, since the gas flow from the first notch(es) 38 would balance the gas flow from the second notch(es) 40, e.g. if the gas generator were initiated by mistake. The gas generator 6 also comprises studs 42 for fastening of the gas generator 6 to the seat frame 8.

Figure 11:
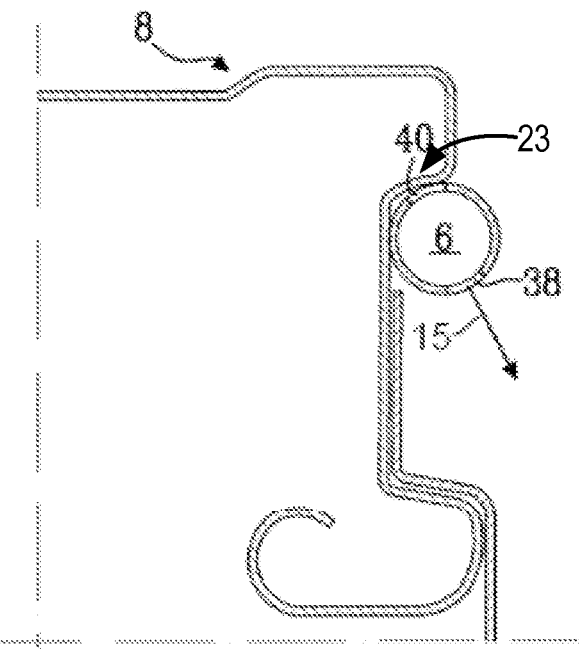
FIG. 11 illustrates the gas generator of FIG. 10 mounted in a seat.

FIG. 11 illustrates a plan view of the gas generator 6 of FIG. 10 when mounted in the seat, with the airbag being removed for better visibility. The seat frame 8 has a shape adapted to that of the gas generator 6, such that the seat frame 8 blocks, or at least partly obstructs, the second notch 40. Therefore, when the gas generator 6 is mounted in the seat, the gas generator 6 will primarily emit gas in the pre-selected direction. A deflector 23 blocking the second notch 40 may be an additional plate, or as in this case, be a part of the seat frame 8.

When mounted, the gas generator 6 primarily emits gas in the pre-selected direction 15. This differs from the prior art gas generator 106 of FIG. 1 emitting gas radially away from the top 112 of the gas generator 106 in a plurality of directions. During manufacturing, storage and transporting, the gas generator 6 is thrust neutral due to that the gas flow from the first notch 38 balances that of the second notch 40 as explained above.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An airbag arrangement for a vehicle, comprising:
a deployable airbag having a packed state and a deployed state;
a gas generator adapted to supply gas to deploy the airbag from the packed state to the deployed state, the gas generator being adapted to, at least during an initial deployment of the airbag, emit a gas flow substantially in a pre-selected direction;
wherein the pre-selected direction is substantially in a longitudinal direction of the vehicle; and
wherein, when the airbag is in the packed state, a portion of the airbag forms a starting pocket comprising two panels with an intermediate apex, the panels extending substantially parallel to the pre-selected direction, the starting pocket positioned with the intermediate apex aligned with the pre-selected direction such that the starting pocket, during the initial deployment of the airbag, initially receives the gas flow and is deployed in the pre-selected direction.

2. The airbag arrangement according to claim 1, wherein the starting pocket is adapted to be deployed by the gas flow flowing substantially in the pre-selected direction during deployment of the airbag.

3. The airbag arrangement according to claim 1, wherein the two panels of the starting pocket are arranged towards the gas generator, such that the gas flow emitted during the initial deployment is emitted in between the two panels.

4. The airbag arrangement according to claim 1, wherein the airbag in the packed state further comprises at least one additional panel at at least one side of the starting pocket, the additional panel preferably having a panel width substantially corresponding to a length of the starting pocket.

5. The airbag arrangement according to claim 4, wherein the airbag comprises a same number of additional panels at either side of the starting pocket.

6. The airbag arrangement according to claim 4, wherein the airbag comprises more additional panels at one side of the starting pocket than at the other side of the starting pocket.

7. The airbag arrangement according to claim 6, wherein the gas generator is arranged asymmetrically within the airbag.

8. The airbag arrangement according to claim 6, wherein a cross-sectional length axis of the airbag differs from the pre-selected direction when the airbag is fully deployed.

9. The airbag arrangement according to claim 1, wherein the airbag in its packed state further comprises at least one tear seam connecting two adjacent panels, the tear seam being adapted to break during deployment of the airbag.

10. The airbag arrangement according to claim 1, wherein a portion of the starting pocket comprises a reinforcing fabric layer at a location corresponding to where the gas flow emitted in the pre-selected direction initially hits the starting pocket.

11. The airbag arrangement according to claim 1, wherein the airbag arrangement further comprises a tubular structure leading from the gas generator into the starting pocket.

12. The airbag arrangement according to claim 1, wherein the airbag further comprises at least one airbag seam forming a gas flow channel arranged to collect the gas flow during the initial deployment, thereby guiding the gas flow in the pre-selected direction.

13. The airbag arrangement according to claim 1, wherein a side wall of the gas generator comprises a first notch on a side of the gas generator corresponding to the pre-selected direction, wherein the gas flow is emitted through the first notch substantially in the preselected direction.

14. The airbag arrangement according to claim 13, wherein the side wall of the gas generator further comprises a second notch positioned opposite to the first notch.

15. The airbag arrangement according to claim 14, wherein the airbag arrangement further comprises a deflector, the gas generator being attached to the deflector, such that the second notch is at least partly blocked during deployment of the airbag by the deflector.

16. A seat of a vehicle, the seat comprising an airbag arrangement, the airbag arrangement comprising:
a deployable airbag having a packed state and a deployed state;
a gas generator adapted to supply gas to deploy the airbag from the packed state to the deployed state, the gas generator being adapted to, at least during an initial deployment of the airbag, emit a gas flow substantially in a pre-selected direction;
wherein the pre-selected direction is selected such that the airbag will be deployed into a space between the seat and a side of the vehicle;
wherein the pre-selected direction is substantially in a longitudinal direction of the vehicle; and
wherein, when the airbag is in the packed state, a portion of the airbag forms a starting pocket comprising two panels with an intermediate apex, the panels extending substantially parallel to the pre-selected direction, the starting pocket positioned with the intermediate apex aligned with the pre-selected direction such that the starting pocket, during the initial deployment of the airbag, initially receives the gas flow and is deployed in the pre-selected direction.

17. A method of packing an airbag for a vehicle, comprising:
pre-selecting a deployment direction of the airbag, a gas generator being adapted to deploy the airbag from a packed state to a deployed state, the gas generator further adapted to, at least during an initial deployment of the airbag, emit a gas flow substantially in the pre-selected deployment direction, the pre-selected deployment direction being substantially in a longitudinal direction of the vehicle;
forming a starting pocket in the airbag comprising two panels with an intermediate apex;
aligning the starting pocket in the pre-selected deployment direction of the airbag with the panels extending substantially parallel to the pre-selected deployment direction, such that the starting pocket, during the initial deployment of the airbag, initially receives the gas flow and is deployed in the pre-selected deployment direction; and
folding and/or rolling the airbag except for the starting pocket, at at least one side of the starting pocket.

18. The method of claim 17, further comprising:
varying an amount of airbag fabric at either side of the starting pocket based on the pre-selected deployment direction.

19. The method of claim 16, wherein varying the amount of airbag fabric at either side of the starting pocket comprises selecting a number of additional panels at either side of the starting pocket and selecting widths of the additional panel(s).

20. The method of claim 18, further comprising varying the amount of airbag fabric at either side of the starting pocket based on whether the location of the gas generator is symmetric or asymmetric within the airbag.

* * * * *